US008685499B2

(12) United States Patent
Martin et al.

(10) Patent No.: US 8,685,499 B2
(45) Date of Patent: Apr. 1, 2014

(54) PROCESS FOR COMBATING THE APPEARANCE OF HAZE DURING THE COATING OF FLEXIBLE SUPPORTS WITH A CROSSLINKABLE LIQUID SILICONE COMPOSITION, IN A ROLL DEVICE

(75) Inventors: Nadia Martin, Lyons (FR); Tania Ireland, Lyons (FR); Jean-Marc Frances, Meyzieu (FR); Martial Deruelle, Mornant (FR); Yassine Maadadi, Decines (FR)

(73) Assignee: Bluestar Silicones France SAS, Lyon Cedex (FR)

( * ) Notice: Subject to any disclaimer, the term of this patent is extended or adjusted under 35 U.S.C. 154(b) by 890 days.

(21) Appl. No.: 12/665,189

(22) PCT Filed: Jun. 19, 2008

(86) PCT No.: PCT/EP2008/057759
§ 371 (c)(1),
(2), (4) Date: Aug. 20, 2010

(87) PCT Pub. No.: WO2008/155374
PCT Pub. Date: Dec. 24, 2008

(65) Prior Publication Data
US 2010/0310780 A1    Dec. 9, 2010

(30) Foreign Application Priority Data

Jun. 21, 2007  (FR) ..................................... 07 04442

(51) Int. Cl.
*C09D 183/04* (2006.01)
*B05D 1/28* (2006.01)
*C08F 2/46* (2006.01)

(52) U.S. Cl.
USPC ........................ 427/428.01; 524/588; 522/172

(58) Field of Classification Search
None
See application file for complete search history.

(56) References Cited

U.S. PATENT DOCUMENTS

| | | |
|---|---|---|
| 3,159,601 A | 12/1964 | Ashby |
| 3,159,602 A | 12/1964 | Hamilton et al. |
| 3,220,972 A | 11/1965 | Lamoreaux |
| 3,377,432 A | 4/1968 | Abbott et al. |
| 3,419,593 A | 12/1968 | Willing |
| 3,715,334 A | 2/1973 | Karstedt |
| 3,814,730 A | 6/1974 | Karstedt |
| 4,450,283 A | 5/1984 | McAfee et al. |
| 4,699,813 A | 10/1987 | Cavezzan |
| 4,741,966 A | 5/1988 | Cavezzan |
| 4,808,391 A | 2/1989 | Leavitt et al. |
| 5,422,412 A * | 6/1995 | Morita et al. .................. 528/25 |
| 5,446,087 A | 8/1995 | Chizat et al. |
| 5,468,805 A * | 11/1995 | Onishi ......................... 524/731 |
| 5,545,682 A * | 8/1996 | Kaiya et al. .................. 524/265 |
| 5,698,655 A | 12/1997 | Chung et al. |
| 5,994,454 A * | 11/1999 | Chung et al. ................. 524/731 |
| 6,057,033 A | 5/2000 | Bilodeau |
| 6,586,535 B1 * | 7/2003 | Clark et al. .................. 525/478 |
| 6,727,338 B1 | 4/2004 | Kilgour et al. |
| 6,805,914 B2 * | 10/2004 | Clark et al. .................. 427/387 |
| 6,890,601 B2 * | 5/2005 | Griswold et al. ............. 427/387 |
| 2003/0134043 A1 * | 7/2003 | Herzig et al. ................ 427/372.2 |
| 2005/0020764 A1 | 1/2005 | Dhaler et al. |
| 2005/0106399 A1 | 5/2005 | Lautenschlager et al. |
| 2007/0087207 A1 | 4/2007 | Irifune |
| 2007/0275255 A1 * | 11/2007 | Ooms et al. .................. 428/447 |
| 2008/0276836 A1 * | 11/2008 | Schlitzer et al. ........ 106/287.14 |
| 2008/0281055 A1 * | 11/2008 | Schlitzer et al. ............. 525/478 |

FOREIGN PATENT DOCUMENTS

| | | |
|---|---|---|
| JP | 6264011 | 9/1994 |
| WO | 0250202 | 6/2002 |
| WO | WO 2005063890 A2 * | 7/2005 |

OTHER PUBLICATIONS

International Search Report of PCT/EP2008/057759; dated Aug. 7, 2008 (3 pages).

* cited by examiner

*Primary Examiner* — Robert S Loewe
(74) *Attorney, Agent, or Firm* — Miles & Stockbridge, P.C.

(57) ABSTRACT

Coating of flexible materials with liquid compositions is disclosed. The compositions advantageously comprise one or more polyorganosiloxanes crosslinkable by polyaddition, by dehydrocondensation, by polycondensation, cationically or free-radically to form a protective coating or film having, in particular, release and/or water-repellency properties.

16 Claims, No Drawings

PROCESS FOR COMBATING THE APPEARANCE OF HAZE DURING THE COATING OF FLEXIBLE SUPPORTS WITH A CROSSLINKABLE LIQUID SILICONE COMPOSITION, IN A ROLL DEVICE

CROSS REFERENCE TO RELATED APPLICATIONS

This application is a §371 National Phase of PCT/EP2008/057759 filed Jun. 19, 2008, which claims priority to FR 0704442 filed Jun. 21, 2007.

BACKGROUND OF THE INVENTION

1. Field of the Invention

The invention relates to the general field of the silicone coating, on high-speed rolls, of various flexible supports, such as sheets of paper or of synthetic polymer (polyolefin, polyester, etc), or else of textile.

More specifically the invention concerns the coating of flexible materials with liquid compositions comprising one or more polyorganosiloxanes crosslinkable by polyaddition, by dehydrocondensation, by polycondensation, cationically or free-radically to form a protective coating or film having, in particular, release and/or water-repellency properties.

2. Description of Related Art

The flexible supports may be papers, cards, plastic films or metallic films. The applications of these silicone-coated supports are, for example: paper for food use (baking molds, wrapping), adhesive label/tape, packing and sealing material, etc.

The coating of these flexible supports with crosslinkable liquid silicones is carried out on coating devices which operate continuously and at very high speed. These devices comprise coating heads composed of a number of rolls, including in particular a press roll and a coating roll, which is fed continuously with crosslinkable liquid silicone composition, by means of a series of rolls which are associated with one another. The web of flexible support circulates at high speed between the press roll and the coating roll and is thereby coated on at least one of its faces with a silicone film which is intended to be crosslinked by crosslinking means disposed downstream of the coating head. These crosslinking means may be emitters of heat, of radiation (e.g., ultraviolet) or of electron beams, for example.

In the race for productivity, the producers of silicone release-coated flexible supports are customers for liquid silicone coating formulations which are suited to increasingly high linear running speeds of the flexible support web. The economic factor is obviously not insignificant in this search for new silicone formulations for high-speed coating.

Nevertheless, the high speeds on continuous coating machines are known to be a byword for problems of transfer of the liquid silicone film from the coating roll to the moving flexible support web. These transfer problems ("splitting") are manifested, in particular, in the incidence of a mist or aerosol ("misting", "fogging") in the area around the coating head and, more particularly, at the points of contact between the rotating rolls and/or between the coating roll and the flexible support to be coated. The density of this mist or of this aerosol increases in line with the linear running speed and hence the speed of rotation of the rolls.

Consequences of this phenomenon are, first of all, a loss of consumable material, and in particular the deposition of droplets of coating liquid on the support downstream (for example, at the oven), which is seriously detrimental to the quality of the coating.

Moreover, this undesirable formation of mist has adverse consequences from the standpoints of industrial hygiene and of safety for the operatives, who are exposed to a high level of aerosol in the vicinity of the roll coating device. This aerosol may be toxic.

Furthermore, the misting gives rise to the rapid fouling of the roll coating device, causing maintenance constraints and premature wear.

To guard against the consequences of this mist, it is usual to dispose a suction withdrawal system around the coating head, allowing said mist to be captured.

Moreover, the skilled worker knows of a certain number of adjustments to the coating head in order to obviate this phenomenon. Some examples of this include:

A. lowering the speed, which is detrimental to productivity;
B. reducing the silicone deposition rate, which is detrimental to the properties of the flexible silicone support it is desired to obtain (appearance, covering, release, mechanical properties);
C. increasing the difference between the tangential speed of the coating roll and the linear speed of the paper; however, beyond a certain differential, the homogeneity of the coating layer is severely disturbed; moreover, it is possible by this means to reduce the density of the mist without eliminating it sufficiently to allow a significant increase in coating speed;
D. increasing the pressure between the coating roll and the press roll; here again, to a certain limit, and without advantageous suppression of the phenomenon of mist formation.

Another approach for controlling the formation of mist in roll coating machines involves acting on the formulation of the liquid silicone coating composition.

In accordance with this approach, it is known to reduce the number-average degree of polymerization of the polyorganosiloxanes forming the silicone coating liquid and, consequently, to reduce the viscosity of the silicone coating bath so as to limit the density of the mist.

These known techniques are subject to a serious drawback, in that they substantially modify the properties and, in particular, the release of the flexible silicone-treated support it is desired to obtain.

To illustrate this approach by way of the silicone formulation, it is possible to cite international patent application WO 2004/046248, which describes the use of star-branched silicone polymers used as an antimisting additive for coating applications on flexible supports. The process for preparing these star-branched silicone polymers comprises incompletely reacting (by hydrosilylation) a polyorganosiloxane containing reactive ≡SiH units with a long-chain olefin to give a partially substituted polyhydroorgano-siloxane, which is subsequently reacted by hydrosilylation with a vinyl silicone resin of MQ type and a long-chain diolefin. It is clear that compositions of this kind are relatively complex and therefore costly to obtain. Moreover, they still remain capable of improvement in terms of controlling misting in high-speed silicone roll coating.

European patent EP-0 716 115 describes a process for preparing a silicone composition for high-speed coating with rolls, said composition being presented as permitting a reduction in mist density. According to this process, a trimethylsilyl-terminated polydimethylmethylhydrosiloxane with a degree of polymerization of 12, and also 0.01% of a polydimethylsiloxane which is substituted by perfluoroethylbutyl and methylvinyl functions, whose end groups are dimethylvinylsiloxy groups, and whose degree of polymerization is 300, and also polypropylene glycol and, optionally, a stearyl or oleyl alcohol are employed. This leads to polydimethylsiloxanes which are functionalized with polyoxypropylene groups. These functionalized polydimethylsiloxanes are combined with other functionalized polydimethylsiloxanes, functionalized for example with hexenyl units, and are also combined with a platinum-based hydrosilylation catalyst, to form silicone coating compositions which permit a reduction in mist formation. The functionalization units may be hydrophobic residues such as stearic or oleic acid residues.

U.S. Pat. No. 4,806,391 relates to silicone-based inks and varnishes, and more specifically to a method of applying these inks/varnishes to a substrate, using a roller coating machine operating at high speed. This patent discloses, in particular, compositions comprising vinyl-terminated polydimethylsiloxanes with a viscosity at 25° C. of between 15 000 and 50 000 mPas. These liquid coating compositions further comprise a platinum-based catalyst and a rheological additive composed of silica with a high specific surface area, more particularly fumed silica.

The American U.S. Pat. No. 6,057,033 discloses silicone compositions intended for coating on flexible supports to form, after UV-induced cationic crosslinking, a release coating. In addition to the polyorganosiloxanes, these compositions comprise cellulose fibers which have an average length of between 15 and 100 μm and an average thickness of between 5 and 40 μm. The polyorganosiloxanes employed are polyorganosiloxanes which are functionalized with crosslinking groups of acryloxy or methacryloxy type, allowing UV-induced free-radical crosslinking.

The cellulose fibers incorporated into the composition make it possible to provide a solution to the technical problem, which is that of obtaining a nonbrittle crosslinked silicone release coating. The cellulose fibers are presented as producing improvements with regard to the transfer of the silicone coating film to the support, resistance to die cutting, mechanical properties (tensile resistance and tearing resistance), the anchoring of the coating to the paper, the reduction of the absorption of the coating liquid within the paper, and, incidentally, the reduction of mist formation.

On this last point, U.S. Pat. No. 6,057,033 does not provide any quantitative element for assessing the reduction in mist to which the cellulosic fibers give rise. There is good reason to think that this reduction remains completely inadequate.

Also cited, for report, is Japanese patent application JP-62 64 011, which describes a coating liquid comprising a film-forming resin and a solvent and which further comprises wax particles with a diameter of between 1 and 10 μl, the diameter of the coarsest particle being not more than 150% of the thickness of the wet coating film applied to the support. A coating liquid of this kind would allow an increase in coating speed of at least 10 to 30 m/min, by virtue a priori of a limitation on the formation of mist. The teaching of such a document is remote since it does not relate to silicone coatings.

SUMMARY OF THE INVENTION

In the light of this prior art, one of the essential objectives of the invention is to provide an effective method of controlling misting when coating flexible supports with a liquid silicone composition which is a precursor of crosslinked coatings, said coating taking place with the aid of a roll coating device operating at high speed.

Another essential objective of the invention is to provide a simple and economic method of controlling misting when coating flexible supports with a silicone composition intended for crosslinking, said coating taking place in a roll coating device operating at high speed.

Another essential objective of the invention is to provide a new liquid silicone composition X which is a precursor of silicone coating(s) and which no longer exhibits misting during high-speed roll coating.

Another essential objective of the invention is to provide a method of controlling misting in the context of the coating of flexible supports, with a silicone composition which can be crosslinked to give release coatings, by means of a roll coating device.

All of these objectives, among others, are attained by the present invention, which first provides a method of controlling misting when coating flexible supports, comprising steps I) and II) below:

I) preparing a liquid silicone composition X which is a precursor of silicone coating(s) and comprises:
   at least one polyorganosiloxane A crosslinkable by polyaddition, by dehydrocondensation, by polycondensation, cationically or free-radically,
   optionally at least one crosslinking organosilicon compound B,
   optionally at least one catalyst or photoinitiator C of a kind selected according to the type of reaction envisaged for said polyorganosiloxane A,
   optionally at least one adhesion modulator system K, and
   optionally at least one crosslinking inhibitor D; and (II) coating said liquid silicone composition X onto a flexible support by means of a roll coating device, said method being characterized in that in step a) said liquid silicone composition X is admixed with an antimisting additive E which has the following characteristics:
   it is in a liquid form, optionally following dilution by means of a diluent J', a solvent J", or in one of the constituents of said liquid silicone composition X, and
   it is obtainable:

1) by reacting, preferably at a temperature of between 0° C. and 200° C., one or more compounds selected from compounds a) to d) below:
   a) an organosilicon resin F (optionally diluted by means of a diluent J', a solvent J", or in one of the constituents of said liquid silicone composition X) comprising in its structure at least two different siloxy units selected from those of formula:

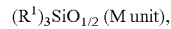 (M unit),

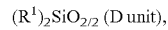 (D unit),

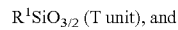 (T unit), and

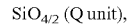 (Q unit), in which units:
   the radicals R$^1$, which are identical or different, are selected from linear or branched C$_1$ to C$_6$ alkyl radicals, C$_2$ to C$_4$ alkenyl radicals, and 3,3,3-trifluoropropyl, with the following conditions:
      that at least one of these units is a T or Q unit, and
      that said organosilicon resin F comprises groups ≡SiOH and/or ≡SiOR$^2$, the amount by weight of groups OH and/or OR$^2$ being between 0.2% and 10% by weight, with R$^2$ being a linear or branched C$_1$ to C$_6$ alkyl radical,
   b) an organosilicon compound N of general formula:

in which $R^3$ is a monovalent hydrocarbon group having 1 to 5 carbon atoms, X is a hydrolyzable group, and d has an average value≤1;
c) a partially hydrolyzed condensate L of said organosilicon compound N;
d) a condensate M of said organosilicon resin F with said organosilicon compound N or said condensate L;
with:
e) at least one organosiloxane monomer, oligomer and/or polymer G which has per molecule at least one reactive unit ≡SiOH and/or ≡SiR, where R is a $C_1$-$C_{40}$ carbinol radical,
in the presence:
of at least one polycondensation catalyst H,
optionally of a filler Z, and
optionally of at least one diluent J' or solvent J", and
2) by isolating the antimisting additive E, optionally after removal of the condensation catalyst H, and/or devolatilization and/or neutralization.

Examples of organosilicon resin F include organosilicon resins prepared by cohydrolysis and/or cocondensation of alkoxysilanes by methods which are known to the skilled worker, or of chlorosilanes selected from the group consisting of those of formulae $(R^1)_3SiCl$, $(R^1)_2Si(Cl)_2$, $R^1Si(Cl)_3$, and $Si(Cl)_4$. These resins are branched organopolysiloxane oligomers or polymers which are well known and available in the trade. In their structure they have at least two different siloxy units selected from those of formula $(R^1)_3SiO_{0.5}$ (M unit), $(R^1)_2SiO$ (D unit), $R^1SiO_{1.5}$ (T unit), and $SiO_2$ (Q unit), at least one of these units being a T or Q unit. The radicals $R^1$ are distributed such that the resins contain approximately 0.8 to 1.8 radicals $R^1$ per silicon atom. Furthermore, these resins are not fully condensed, and they still possess approximately from 0.001 to 1.5 OH groups and/or alkoxy groups $OR^2$ per silicon atom. The radicals $R^1$ and $R^2$ are as defined above.

DETAILED DESCRIPTION OF A PREFERRED EMBODIMENT

Examples of organosilicon resin F include MQ resins, MDQ resins, TD resins, and MDT, $M^{vinyl}Q$, $MD^{vinyl}Q$ and $QQ^{OH}$ resins, the groups OH and/or $OR^2$ being carried by the M, D and/or T units, and the amount by weight of groups OH and/or $OR^2$ being between 0.2% and 10% by weight.

Examples of organosilicon compounds N include the group consisting of: $CH_3Si(OCH_3)_3$, $CH_3Si(OC_2H_5)_3$, $(CH_2=CH)Si(OCH_3)_3$, $C_6H_5Si(OC_2H_5)_3$, $Si(OC_2H_5)_4$, $Si(OC_3H_7)_4$, $(CH_2=CH)Si(OC_2H_5)_3$, and $Si(OC_2H_4OC_2H_5)_4$.

The compound G has per molecule at least one reactive unit ≡SiOH and/or ≡SiR, R being a carbinol radical, and is selected from the group consisting of the compounds of formulae (I) and (II):

$$(D^{OH})_iD_j(T^{OH})_kT_lQ_mM_n \quad (I)$$

$$M_o(D^R)_pD_qT_rQ_s(M^R)_t \quad (II)$$

in which:
i, j, k, l, m, and n are numbers≥0, with i+k>0, and preferably m=0 and s=0,
o, p, q, r, s and t are numbers≥0, with p+t>0,
$M=R^{10}R^{11}R^{12}SiO_{1/2}$
$D=R^{13}R^{14}SiO_{2/2}$
$D^R=RR^{15}SiO_{2/2}$
$T=R^{16}SiO_{3/2}$
$Q=SiO_{4/2}$
$M^R=RR^{17}R^{18}SiO_{1/2}$
$D^{OH}=R^{19}R^{20}(OH)SiO_{1/2}$
$T^{OH}=R^{21}(OH)SiO_{2/2}$
R is a $C_1$-$C_{40}$ carbinol group, and
the symbols $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$, which are identical or different, each represent, independently of one another:
a linear or branched alkyl radical containing 1 to 20 carbon atoms which is optionally substituted by at least one halogen, preferably fluorine, the alkyl radicals being preferably methyl, ethyl, propyl, octyl, and 3,3,3-trifluoropropyl,
a cycloalkyl radical containing between 5 and 8 cyclic carbon atoms, which is optionally substituted,
an aryl radical containing between 6 and 12 carbon atoms, which is optionally substituted,
an alkenyl, preferably vinyl or allyl,
a radical comprising one or more functional groups of epoxide-ether, or polyether, type, and/or
an aralkyl moiety having an alkyl moiety containing between 5 and 14 carbon atoms and an aryl moiety containing between 6 and 12 carbon atoms, which is optionally substituted on the aryl moiety by halogens and/or alkyls.

In one preferred embodiment the organosiloxane G is an organosiloxane polymer, preferably a linear polydimethylsiloxane having at least one chain-end unit SiOH.

Especially suitable for the invention as component G are the compounds of formula:

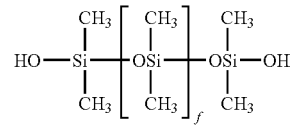

in which: 1≤f≤2000, preferably 1≤f≤1000.

The conditions defined in the method of preparation of the antimisting additive E, i.e., the nature of the reaction (condensation reaction), make it possible to obtain an additive which is in a liquid form having entirely remarkable antimisting properties. Without wishing to be limited to any one scientific theory or any one mechanism, it appears that this property of the antimisting additive E according to the invention is due to the nature of the reaction involved (condensation reaction), which allows branch polymers to be obtained that have viscoelastic properties, which are useful in controlling misting in a roll coating system operating at high speed. These viscoelastic properties are manifested in a highly mobile appearance of the antimisting additive E.

The antimisting additive E according to the invention is employed in amounts which are sufficient to reduce the quantity of misting during coating. A skilled worker is of course able, by means of routine tests, to determine these amounts without difficulty. For example, he or she is able to employ the additive according to the invention in amounts of between 0.1 to 15 parts by weight relative to the total weight of the liquid silicone composition X which is a precursor of silicone coating(s).

By "condensation" is meant a reaction between ≡SiOH (or ≡SiOR) units, leading to the formation of siloxy bonds ≡Si—O—Si≡ and to the liberation of water (or alcohol). This reaction is catalyzed by an effective amount of a condensation catalyst H.

A skilled person will know how to determine the effective amount of the condensation catalyst H in accordance with the type of catalyst used. An effective amount for the purposes of the invention is the amount sufficient to initiate the reaction. This amount is preferably determined such that it is the smallest possible, so as to allow effective preservation of the composition over time. Useful concentrations of catalyst are located at between $1\times10^{-6}$ and 5, preferably between $1\times10^{-5}$ and 2, parts by weight, relative to the weight of organosiloxane polymer solids to be reacted. Any catalyst capable of initiating a condensation reaction will be suitable. Condensation or polycondensation catalysts are generally compounds of a metal selected from tin, titanium, and zirconium. It is therefore possible to use tin monocarboxylates and dicarboxylates, such as tin 2-ethylhexanoate, dibutyltin dilaurate, dibutyltin diacetate, hexacoordinated chelates of tin with a valence of IV, etc., such as those described in EP-A-0 367 69 or those cited on pages 205 and 307 of the work "Chemistry and technology of silicones" by NOLL, Academic Press, 1968-2nd edition).

The following may also be used:
basic catalysts such as, for example: potassium hydroxide KOH, potassium siliconates, phosphazenes, carbenes, the combination of KOH and a cryptant such as kryptofix, or
acidic catalysts such as: hydrochloric acid, sulfuric acid, trifluoromethanesulfonic acid, Tonsil® and sulfonic resins of Amberlyst® type.

The crosslinking inhibitor D is generally used to provide the ready-to-use composition with a certain potlife. Acting both on the nature of the catalytic system and its concentration in the composition (resulting in a given crosslinking rate) and also on the nature of the retardant and on its concentration, it is possible to adjust the potlife. The activity of the catalytic system is restored by heating (thermoactivation).

The crosslinking inhibitor D is preferably selected from acetylenic alcohols (ethynylcyclohexanol: ECH), diallyl maleates, triallyl isocyanurates, dialkyl maleates (diethyl maleates or dialkylalkynyl dicarboxylates)(diethylacetylene dicarboxylate) or else from polyorganosiloxanes, which advantageously are cyclic and are substituted by at least one alkenyl, particular preference being given to tetramethylvinylcyclotetrasiloxane, or alkyl maleates.

Acetylenic alcohols (see, for example, FR-B-1 528 464 and FR-A-2 372 874) are retardants which are useful according to the invention. Examples include the following:
1-ethynylcyclohexan-1-ol;
3-methyldodec-1-yn-3-ol;
3,7,11-trimethyldodec-1-yn-3-ol;
1,1-diphenylprop-2-yn-1-ol;
3-ethyl-6-ethylnon-1-yn-3-ol;
3-methylpentadec-1-yn-3-ol.

These α-acetylenic alcohols are commercial products.

In the liquid silicone composition X which is a precursor of silicone coating(s), it may be advantageous to employ at least one adhesion modulator system K, to allow the release properties of the crosslinked silicone coating to be controlled.

For illustration of an adhesion modulator system K in silicone formulations for release paper or adhesive tape having a polymeric support, European patent application EP-A-0 601 938 may be cited, the content of which is included in its entirety in the present specification.

In one version, the adhesion modulator system K is:
in the case of a formulation which crosslinks by polyaddition: a polyorganosiloxane resin of formula $MD^{Vi}Q$; $MM^{Vi}Q$; $MM^{Vi}D^{Vi}Q$; $MM^{Vi}DD^{Vi}Q$; $MD^HQ$ or $MM^HQ$ (where Vi=vinyl group)
in the case of a formulation which crosslinks by polycondensation: a polyorganosiloxane resin of formula $M^{OH}Q$, and
in the case of a formulation which crosslinks under radiation: a polyorganosiloxane resin of formula $MD^HQ$ or $MM^HQ$.

Examples of diluent and/or solvents J' and J" include aliphatic and aromatic solvents, chlorinated solvents, e.g., white spirit, ketones such as methyl ethyl ketone and acetone, alcohols such as isopropanol and n-butyl alcohol, saturated, unsaturated or aromatic hydrocarbons, advantageously pentane, hexane, heptane, octane, toluene, xylene, and benzene, petroleum cuts termed "naphthas"; $C_7$-$C_8$ petroleum cuts, polysiloxanes which are not reactive for a condensation reaction, such as polydimethylsiloxanes, and halogenated hydrocarbons, and mixtures thereof.

The polyorganosiloxanes A of the liquid silicone composition X which is a precursor of silicone coating(s) may be of the type which crosslink at ambient temperature or under hot conditions by polyaddition reactions in the presence of a metal catalyst, based in the present case on platinum. These are crosslinkable polyorganosiloxane compositions referred to as RTV ("Room Temperature Vulcanizing") or polyaddition polyorganosiloxane compositions termed HVE, which is the abbreviation of "hot-vulcanizable elastomer".

The two-component or single-component RTV or polyaddition HVE polyorganosiloxane compositions undergo hardening or crosslinking essentially via reactions of hydrosilyl groups with silyl alkenyl groups in the presence, generally, of a metal catalyst (preferably a platinum catalyst). They are described in, for example, U.S. Pat. Nos. 3,220,972, 3,284, 406, 3,436,366, 3,697,473, and 4,340,709.

The polyorganosiloxanes A may also be of the type which crosslink at ambient temperature by polycondensation reactions under the action of moisture, in the presence, generally, of a metal catalyst, for example, a tin compound (polycondensation RTV). Compositions employing this type of polyorganosiloxane are described in, for example, U.S. Pat. Nos. 3,065,194, 3,542,901, 3,779,986, and 4,417,042 and in patent FR-2 638 752 (single-component compositions) and in U.S. Pat. Nos. 3,678,002, 3,888,815, 3,933,729, and 4,064,096 (two-component compositions).

The polyorganosiloxanes A which form part of these polycondensation RTV compositions are linear, branched or crosslinked polysiloxanes which carry hydroxyl groups or hydrolyzable groups, alkoxy groups for example. Compositions of this kind may additionally contain a crosslinking agent, which is, in particular, a compound bearing at least 3 hydrolyzable groups, such as a silicate, an alkyltrialkoxysilane or an aminoalkyltrialkoxysilane, for example.

The liquid silicone composition X may also comprise one or more polyorganosiloxanes A which are crosslinkable cationically or free-radically:
in the presence of an effective amount of cationic initiator systems (thermal initiators and/or photoinitiators)
organometallic complex or onium borate initiators, proton-donating organic solvents (isopropyl alcohol, benzyl alcohol, etc.), and/or
where appropriate, in the presence of a free-radical initiator, via activation by actinic radiation (UV) or by electron beams.

These polyorganosiloxanes are, for example, linear or cyclic vinyl ether silicones and/or epoxy silicones. Epoxy- or vinyloxy-functional polyorganosiloxanes of these kinds are described more particularly in patents DE-4 009 889, EP-0 396 130, EP-0 355 381, EP-0 105 341, FR-2 110 115, and FR-2 526 800. The epoxy-functional polyorganosiloxanes may be prepared by hydrosilylation reactions of oils containing ≡SiH units and epoxy-functional compounds such as 1,2-epoxy-4-vinyl-4-cyclohane (VCMX) or allyl glycidyl ether. The vinyloxy-functional polyorganosiloxanes may be prepared by hydrosilylation reaction of oils containing SiH units and vinyloxy-functional compounds such as allyl vinyl ether or allylvinyloxyethoxybenzene.

In one preferred version of the method according to the invention, the liquid silicone composition X which is a precursor of silicone coating(s) and which is admixed with the antimisting additive E comprises:
 at least one polyorganosiloxane A crosslinkable by polyaddition,
 optionally at least one crosslinking organosilicon compound B,
 at least one catalyst C1 of the polyaddition reaction,
 optionally at least one adhesion modulator system K, and
 optionally at least one crosslinking inhibitor D.

According to this preferred version, the polyorganosiloxane A is of the type crosslinking by polyaddition and has siloxy units of formula (III), with optionally at least some of the other units being siloxy units of average formula (IV):

$$W_a Z_b SiO \frac{4-(a+b)}{2} \quad (III)$$

$$Z_c SiO \frac{4-c}{2} \quad (IV)$$

in which formulae:
 W is an alkenyl group, preferably vinyl or allyl,
 the symbols Z, which are identical or different, represent:
  a linear or branched alkyl radical which contains 1 to 20 carbon atoms and is optionally substituted by at least one halogen, preferably fluorine, the alkyl radicals being preferably methyl, ethyl, propyl, octyl, and 3,3,3-trifluoropropyl,
  a cycloalkyl radical which contains between 5 and 8 cyclic carbon atoms and is optionally substituted,
  an aryl radical which contains between 6 and 12 carbon atoms and is optionally substituted, and/or
  an aralkyl moiety which has an alkyl moiety containing between 5 and 14 carbon atoms and an aryl moiety containing between 6 and 12 carbon atoms, and is optionally substituted on the aryl moiety by halogens and/or alkyls,
 a is 1 or 2, preferably 1, b is 0, 1 or 2, and a+b=1, 2 or 3, and c=0, 1, 2 or 3.

Examples of polyorganosiloxanes A which are crosslinkable by polyaddition are dimethylpolysiloxanes having dimethylvinylsilyl end groups, methylvinyldimethylpolysiloxane copolymers having trimethylsilyl end groups, and methylvinyldimethylpolysiloxane copolymers having dimethylvinylsilyl end groups.

The crosslinking organosilicon compound B is preferably of the type which has units of formula (V), with optionally at least some of the other units being units of average formula (VI):

$$HL_c SiO_{(3-c)/2} \quad (V)$$

$$L_g SiO_{(4-g)/2} \quad (VI)$$

in which:
 the symbols L, which are identical or different, represent:
  a linear or branched alkyl radical which contains 1 to 20 carbon atoms and is optionally substituted by at least one halogen, preferably fluorine, the alkyl radicals being preferably methyl, ethyl, propyl, octyl, and 3,3,3-trifluoropropyl,
  a cycloalkyl radical which contains between 5 and 8 cyclic carbon atoms and is optionally substituted,
  an aryl radical which contains between 6 and 12 carbon atoms and is optionally substituted, and/or
  an aralkyl moiety which has an alkyl moiety containing between 5 and 14 carbon atoms and an aryl moiety containing between 6 and 12 carbon atoms, and is optionally substituted on the aryl moiety by halogens and/or alkyls,
 c=0, 1 or 2, and
 g=0, 1, 2 or 3.

Examples of a crosslinking organosilicon compound B are, for example:
 dimethylpolysiloxane polymers having hydrodimethylsilyl end groups,
 poly(dimethylsiloxane)(methylhydrosiloxy)-α,ω-di-methylhydrosiloxane polymers,
 $MDD^H$: copolymers containing (dimethyl) dimethylhydromethylpolysiloxane units having trimethylsilyl end groups,
 $M^H DD^H$: copolymers containing dimethylhydromethylpolysiloxane units having hydromethylsilyl end groups,
 $MD^H$: hydromethylpolysiloxanes having trimethylsilyl end groups.

The polyaddition catalyst C1 is composed, for example, of at least one metal belonging to the platinum group. This catalyst may more particularly be selected from compounds of platinum and of rhodium. In particular it is possible to use the complexes of platinum with an organic product described in U.S. Pat. Nos. 3,159,601, 3,159,602, and 3,220,972 and in European patents EP-A-0 057 459, EP-A-0 188 978 and EP-A-0 190 530, and the complexes of platinum with vinyl organosiloxanes that are described in U.S. Pat. Nos. 3,419, 593, 3,715,334, 3,377,432, and 3,814,730. The catalyst which is generally preferred is platinum. In this case the amount by weight of the polyaddition catalyst C1, calculated by weight of platinum metal, is generally between 2 and 400 ppm.

Further to these constituents, the liquid silicone composition X which is a precursor of silicone coating(s) may further comprise at least one additive which is common in silicone compositions which crosslink by polyaddition, by polycondensation, cationically or free-radically. Mention may be made, for example, of pigments, etc.

The fillers Z are preferably inorganic fillers. These fillers may be present in the form of very finely divided products; these fillers include pyrogenic silicas and precipitated silicas: their specific surface area is, for example, greater than or equal to 40 m²/g, and is usually in the range 40-300 m²/g.

These fillers Z may also be in the form of products which are more coarsely divided, with an average particle diameter, for example, of more than 1 μm. Examples of such fillers include ground quartz, diatomaceous silicas, iron oxides, zinc oxides, magnesium oxides, the various forms of alumina (hydrated or not); their specific surface area is, for example, less than or equal to 30 m²/g.

The fillers Z may have been surface-modified, by treatment with the various organosilicon compounds that are commonly employed for this purpose. Hence these organosilicon compounds may be organochlorosilanes, diorganocyclopolysiloxanes, hexaorganodisiloxanes, hexaorganodisilazanes or diorganocyclopolysilazanes. The treated fillers contain, in the majority of cases, from 20% to 20% of their weight of organosilicon compounds.

The fillers Z may be composed of a mixture of two or more types of fillers which differ in their granulometry; thus, for example, they may be composed of 30% to 70% of finely divided silicas having a specific surface area of greater than or equal to 40 m$^2$/g, and of 70% to 30% of more coarsely divided silicas with a specific surface area of less than or equal to 30 m$^2$/g.

The invention further provides a liquid silicone composition X which is a precursor of silicone coating(s) and comprises:
- at least one polyorganosiloxane A crosslinkable by polyaddition, by dehydrocondensation, by polycondensation, cationically or free-radically,
- at least one antimisting additive E as described above,
- optionally at least one crosslinking organosilicon compound B,
- optionally at least one catalyst or photoinitiator C of a kind selected according to the type of reaction envisaged for said polyorganosiloxane A,
- optionally at least one adhesion modulator system K, and
- optionally at least one crosslinking inhibitor D.

In one preferred embodiment the liquid silicone composition X which is a precursor of silicone coating(s) comprises:
- at least one polyorganosiloxane A crosslinkable by polyaddition, by dehydrocondensation, by polycondensation, cationically or free-radically,
- at least one antimisting additive E as described above,
- optionally at least one crosslinking organosilicon compound B,
- at least one catalyst or photoinitiator C of a kind selected according to the type of reaction envisaged for said polyorganosiloxane A,
- optionally at least one adhesion modulator system K, and
- optionally at least one crosslinking inhibitor D.

In another preferred embodiment the liquid silicone composition X which is a precursor of silicone coating(s) comprises:
- at least one polyorganosiloxane A crosslinkable by polyaddition, by dehydrocondensation, by polycondensation, cationically or free-radically,
- at least one antimisting additive E as described above,
- at least one crosslinking organosilicon compound B,
- at least one catalyst or photoinitiator C of a kind selected according to the type of reaction envisaged for said polyorganosiloxane A,
- optionally at least one adhesion modulator system K, and
- optionally at least one crosslinking inhibitor D.

In another preferred embodiment the liquid silicone composition X which is a precursor of silicone coating(s) comprises:
- at least one polyorganosiloxane A crosslinkable by polyaddition, by dehydrocondensation, by polycondensation, cationically or free-radically,
- at least one antimisting additive E as described above,
- at least one crosslinking organosilicon compound B,
- at least one catalyst or photoinitiator C of a kind selected according to the type of reaction envisaged for said polyorganosiloxane A,
- at least one adhesion modulator system K, and
- optionally at least one crosslinking inhibitor D.

In another preferred embodiment the liquid silicone composition X which is a precursor of silicone coating(s) comprises:
- at least one polyorganosiloxane A crosslinkable by polyaddition, by dehydrocondensation, by polycondensation, cationically or free-radically,
- at least one antimisting additive E as described above,
- at least one crosslinking organosilicon compound B,
- at least one catalyst or photoinitiator C of a kind selected according to the type of reaction envisaged for said polyorganosiloxane A,
- at least one adhesion modulator system K, and
- at least one crosslinking inhibitor D.

The invention finally provides for the use of the antimisting additive E as defined above to reduce misting when coating flexible supports with a liquid silicone composition X which is a precursor of silicone coating(s).

It is therefore apparent that the invention provides an original, simple, economic, and reliable means of counteracting the production of mist in the coating of flexible supports (of paper, film or polymeric film, for example) in roll coating devices operating at high speed. The practical industrial consequence is that the running speeds can be further increased without incidence of this misting phenomenon, which is detrimental to the quality of coating. The means of control provided by the invention also has the not insignificant advantage of not affecting the appearance qualities, coverage, release properties, and mechanical properties (rub-off) of the crosslinked silicone coating it is desired to obtain on at least one of the faces of the flexible support.

Furthermore, the reduction in misting significantly enhances the hygiene and safety conditions for personnel stationed around industrial devices for silicone coating on rolls operating at high speed.

The purpose of the examples below is to illustrate particular embodiments of the invention, without limiting the scope of the invention to these simple embodiments.

EXAMPLES

Siloxy units:

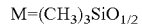

I) Preparation of Antimisting Additives E

Viscosities are measured at 25+/−2° C. using a Brookfield DV-I+ viscometer (spindle S34).

Example 1

Preparation of an Inventive Antimisting Additive E1

A 1-liter three-necked flask equipped with an anchor and an inlet and outlet for a stream of nitrogen is charged with 150 g of a polydimethylsiloxane having trimethylsilyl chain ends (viscosity: 1000 cP at 25° C.), 72 g of a polydimethylsiloxane containing a chain-end hydroxyl function, with a viscosity of 14 000 cP at 25° C., and 7.2 g of a partially hydrolyzed condensate of ethyl silicate (commonly referred to as partially hydrolyzed polyethyl silicate). The mixture is stirred and 0.9 g of an alkali metal catalyst (solution of potassium silanolate in octamethylcyclotetrasiloxane, equivalent KOH content: 14% by weight) is added. The mixture is heated to 130° C. Stirring and heating are maintained. Then 5 g of silica ("Aerogel® 200" from Nippon Aerogel Co., having a specific surface area of 200 m$^2$/g) and 4.7 g of polydimethylsiloxane having a chain-end hydroxyl function and a viscosity of 50 cP at 25° C. are added and dispersed homogeneously using a homomixer. Heating is maintained at 180° C. for 4 hours to finish the reaction. The reaction product is then cooled to ambient temperature, giving a colorless antimisting additive which is highly mobile and transparent, with a viscosity of 2600 cP at 25° C. The entirety of the process is carried out under a nitrogen atmosphere.

Example 2

Preparation of an Inventive Antimisting Additive E2

The antimisting additive is prepared in two steps. Step 1 gives an ultrahigh molecular weight resin.
Step 1:
An ultrahigh molecular weight MQ resin is prepared by reacting a solid MQ resin (A), with a molecular weight (Mw) of 12 900 and a general formula of $SiO_{1.3}(OH)_{1.28}Me_{0.12}$, with a linear polydimethylsiloxane (B) having $\equiv$SiOH chain ends, with a formula of $HO(Me_2SiO)_{15}H$, and with xylene in a three-necked flask equipped with an apparatus commonly referred to as a Dean-Stark apparatus and with a condenser. The molecular weight (Mw) of the compound (A) is 12 900. Compound B is preferably a linear polydimethylsiloxane having $\equiv$SiOH chain ends, with a formula of $HO(Me_2SiO)_{15}H$. The (A)/(B) weight ratio is 15.7/1.

The reaction mixture is heated at reflux (140° C.) and with constant stirring for 24 hours, during which gaseous ammonia, the catalyst, is bubbled continuously into the reaction mixture, and the water produced by the reaction is removed by the Dean-Stark apparatus. At the end of the reaction, the reactor is purged with nitrogen, and the mixture containing the reaction product (1) is cooled to ambient temperature. The Mw of the resin obtained is 665 000, determined by size exclusion chromatography.
Step 2:
A 2-liter three-necked flask containing 52.2 g of a mixture containing 56% of ultrahigh molecular weight MQ resin in xylene, prepared as described above, is charged with 771.6 g of trimethylsiloxy-terminated polydimethylsiloxane, with stirring. The mixture is heated at 180° C. with stirring at 5320 Pa for 1 hour in order to remove the xylene. The mixture is subsequently cooled to 90° C., and then 384 g of silanol-terminated polydimethylsiloxane (3) and 1.8 g of a solution of KOH in isopropanol (1.7 mole of KOH per liter of solution) are added. The mixture is heated at 90° C. under 5330 Pa until the desired viscosity is obtained. At the end of the reaction, the KOH catalyst is neutralized with 0.18 g of acetic acid in 1.92 g of water, and the mixture is stirred for 0.5 hour until it has cooled to ambient temperature. The product obtained is highly mobile and has a viscosity of 31 800 cP at 25° C. Then 35 g of TS-350 silica (fumed silica treated with hexamethyldisilazane or HMDZ, supplied by Cabot Corp.) are added and dispersed homogeneously by means of a homomixer.

Example 3

Preparation of an Inventive Antimisting Additive E3

A one-liter three-necked flask equipped with a stirrer and a nitrogen blanketing system is charged with 280 g of a polydimethylsiloxane having trimethylsilyl chain ends, with a viscosity of 100 mPa·s at 25° C., 505 g of a polydimethylsiloxane having hydroxyl chain ends, with a viscosity of 14 000 mPa·s at 25° C., and 165 g of a mixed polysiloxane containing approximately 31% of an MQ resin whose OH content is 0.7% by weight. The mixture is stirred and then 30.7 g of an alkali metal catalyst (solution of potassium silanolate in octamethylcyclotetrasiloxane, equivalent KOH content: 14% by weight) are added. Stirring is maintained for minutes and then 38.4 g of silica (Tixosil-365®, precipitated silica supplied by Rhodia) are added and dispersed uniformly with the aid of a homomixer. The mixture is subsequently heated at 160° C. for an hour in order to terminate the reaction, and then is cooled to ambient temperature. A highly mobile product is obtained, with a viscosity of ~70 000 cP at 25° C. In order to limit problems of an increase in viscosity on storage, the product may be neutralized with acetic acid or AcOH or a solution of phosphoric acid in polydimethylsiloxane, or diluted in an unreactive polysiloxane.

Example 4

Preparation of an Inventive Antimisting Additive E4

A 1-liter three-necked flask equipped with a stirrer and a nitrogen blanketing system is charged with 280 g of a polydimethylsiloxane having trimethylsilyl chain ends, with a viscosity of 100 cP at 25° C., 505 g of a polydimethylsiloxane having hydroxyl chain ends, with a viscosity of 14 000 cP at 25° C., and 165 g of a mixed polysiloxane containing approximately 31% of an MQ resin whose OH content is 0.7% by weight. The mixture is stirred and 0.76 g of an alkali metal catalyst (solution of potassium silanolate in octamethylcyclotetrasiloxane, equivalent KOH content: 14% by weight) is added. The mixture is heated at 110° C. until the desired viscosity is reached, and then the KOH catalyst is neutralized with a solution of phosphoric acid in polydimethylsiloxane. A transparent, highly mobile product is obtained, with a viscosity of 68 000 cP at 25° C.

Example 5

Preparation of an Inventive Antimisting Additive E5

A 350-ml three-necked flask equipped with a stirrer and a nitrogen blanketing system is charged with 161 g of a polydimethylsiloxane having hydroxyl chain ends, with a viscosity of 14 000 cP at 25° C., and 13.6 g of a mixed polysiloxane containing approximately 31% of an MQ resin whose OH content is 0.7% by weight. The mixture is stirred and 0.024 g of an alkali metal catalyst (solution of potassium silanolate in octamethylcyclotetrasiloxane, equivalent KOH content: 14% by weight) is added. The mixture is heated at 130° C. until the desired viscosity is reached, and then the KOH catalyst is neutralized with a solution of phosphoric acid in polydimethylsiloxane. A transparent, highly mobile product is obtained, with a viscosity of 91 000 cP at 25° C.

Example 6

Preparation of an Inventive Antimisting Additive E6

A 350-ml three-necked flask equipped with a stirrer and a nitrogen blanketing system is charged with 108 g of a polydimethylsiloxane having hydroxyl chain ends, with a viscosity of 3500 cP at 25° C., and 67 g of a mixed polysiloxane containing approximately 31% of an MQ resin whose OH content is 0.7% by weight. The mixture is stirred and 0.051 g of an alkali metal catalyst (solution of potassium silanolate in octamethylcyclotetrasiloxane, equivalent KOH content: 14% by weight) is added. The mixture is heated at 110° C. until the desired viscosity is reached, and then the KOH catalyst is neutralized with a solution of phosphoric acid in polydimethylsiloxane. A transparent, highly mobile product is obtained, with a viscosity of 100 000 cP at 25° C.

II) Test as Antimisting Additive

The antimisting additives E1 to E6 prepared in section I) were tested for antimisting application. The results observed are collated in the tables below, as a measured misting quantity (mg/m$^3$) or in the form of a ratio of misting measured with additive and without additive for different roll rotation speeds.

Test Description

To analyze and quantify the mist produced in a roll coating device operating at high speed, on the laboratory scale a 2-roll device was used (supplied by Ermap, France) which operates reproducibly and is capable of conveying a wad of paper at a linear speed of more than 900 m/min. The two press/coating rolls have a diameter of 10 cm. The press roll is covered with rubber and the coating roll with chromium. The coating roll was cut in dumbbell shape so that the speed of the two rolls is synchronous. The press roll, which can be driven by a motor, is in constant pressure contact with the coating roll. The silicone coating liquid is poured directly into the nip between the two rolls. The amount of fluid used is 0.25 ml.

Different compositions were subsequently prepared by mixing a silicone polymer A1 (a polydimethylsiloxane whose end groups are blocked with a dimethylvinylsiloxy group and whose viscosity is 220 mPa·s) and the products described above in examples 1 to 6, at a rate of 1 to 4 parts by weight of product in 100 parts by weight of polymer. The compositions are homogenized on a barrel rolling device for the time required. The rotary system described above is then used on the rolls on which the preparation in question is spread. Subsequently the rotational speed of the rolls is progressively increased. In parallel, the density of the mist is measured by placing a measuring instrument referred to as a particle counter, which is sold by ITS (France), in proximity to the point of contact between the rolls. The result of the mist density measurement is expressed in mg of silicone aerosol per m$^3$ of air at a given measurement speed.

The table below collates the results obtained:

TABLE II

Results of the antimisting tests as absolute values

| Antimisting additive | % by weight of additive | Misting (mg/m$^3$) at 600 m/min | Misting (mg/m$^3$) at 800 m/min | Misting (mg/m$^3$) at 870 m/min |
|---|---|---|---|---|
| Reference without additive (comparative) | 0 | 21 | 63 | 73 |
| Example 2 (inventive) | 2 | 1 | 5 | 15 |
| Example 3 (inventive) | 2 | 1.7 | 8 | 15 |
| Example 4 (inventive) | 1 | 1 | 6 | 14 |
| Example 5 (inventive) | 1 | 1 | 8 | 17 |
| Example 6 (inventive) | 1 | 2.5 | 10 | 24 |

Additive E1 of example 1 gives good results, similar to the tested additives E2 to E6.

Preparation of a Silicone Release Coating on a Paper Support

Baths are obtained by mixing the following products in succession:

a polydimethylsiloxane silicone polymer whose end groups are blocked with a dimethylvinylsiloxy group and whose viscosity is 220 mPa·s, the additive according to the invention (examples 2, 3 and 4)

a mixture of oils composed of polyhydromethylsiloxane and polydimethylsiloxane copolymers, the two types of copolymers being blocked with trimethylsiloxane groups, a catalyst containing Pt (Karstedt catalyst) in solution in divinyltetramethyldisiloxane.

The proportions of the mixture are calculated so as to give, in the final bath, a ratio between the total number of moles of vinyl groups and the total number of moles of hydrosiloxane groups of 1.8, a platinum concentration of 50 ppm, and an ethynylcyclohexan-1-ol content of the order of 0.15% by weight, relative to the weight of the formulation. Furthermore, the antimisting additive according to the invention is added to the polydimethylsiloxane silicone polymer whose end groups are blocked with a dimethylvinylsiloxy group and whose viscosity is 220 mPa·s, in a proportion of 1% or 2% by weight, relative to the total weight of the formulation. These baths are then used in succession to coat a "glassine" paper support by means of a coating machine whose coating head is a head fitted with four wet rolls. Downstream of this head, a drying station in which air circulates at approximately 195° C. is used to cure the silicone coating by taking it to a maximum temperature of between 130 and 160° C.

After coating operation has been carried out using the above-described baths in succession, results are obtained which are comparable in terms of the reduction in mist during coating, the coating obtained being dry to the touch and of release character.

The invention claimed is:

1. A method of controlling misting when coating flexible supports, comprising steps I) and II):
  I) preparing a liquid silicone composition X which is a precursor of a silicone coating and said composition X comprises:
    at least one polyorganosiloxane A crosslinkable by polyaddition, by dehydrocondensation, by polycondensation, cationically or free-radically,
    optionally at least one crosslinking organosilicon compound B,
    optionally at least one catalyst or photoinitiator C selected according to a reaction envisaged for said polyorganosiloxane A,
    optionally at least one adhesion modulator system K, and
    optionally at least one crosslinking inhibitor D; and
  (II) coating said liquid silicone composition X onto a flexible support by a roll coating device, wherein said liquid silicone composition X is admixed with an antimisting additive E wherein:
    said additive E is in a liquid form, optionally following dilution by a diluent J', a solvent J", or in a constituent of said liquid silicone composition X, and
    said additive E is obtained
      1) by reacting at least one compound selected from compounds a) to d):
        a) an organosilicon resin F (optionally diluted by a diluent J', a solvent J", or in a constituent of said liquid silicone composition X) comprising in a structure thereof, at least two different siloxy units selected from those of formula:
          (R$^1$)$_3$SiO$_{1/2}$ (M unit),
          (R$^1$)$_2$SiO$_{2/2}$ (D unit), $R^1SiO_{3/2}$ (T unit), and
$SiO_{4/2}$ (Q unit), in which units:
the radicals $R^1$, which are identical or different, are selected from linear or branched $C_1$ to $C_6$ alkyl radicals, $C_2$ to $C_4$ alkenyl radicals, and 3,3,3-trifluoropropyl, with the following conditions: that at least one of these units is a T or Q unit, and that said organosilicon resin F comprises groups $\equiv$SiOH and/or $\equiv$SiOR$^2$, the amount by weight of groups OH and/or $OR^2$ being from 0.2% to 10% by weight, with $R^2$ being a linear or branched $C_1$ to $C_6$ alkyl radical,
b) an organosilicon compound N of formula:

$$R^3{}_d SiX_{4-d}$$

in which $R^3$ is a monovalent hydrocarbon group having 1 to 5 carbon atoms, X is a hydrolyzable group, and d has an average value $\leq 1$;
c) a partially hydrolyzed condensate L of said organosilicon compound N;
d) a condensate M of said organosilicon resin F with said organosilicon compound N or said condensate L;
with:
e) at least one organosiloxane monomer, oligomer and/or polymer G which is:

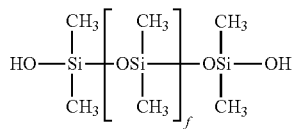

in which $1 \leq f \leq 1,000$,
in the presence:
of at least one polycondensation catalyst H,
optionally of a filler Z, and
optionally of at least one diluent J' or solvent J'', and
2) by isolating the antimisting additive E, optionally after removal of the condensation catalyst H, and/or devolatilization and/or neutralization.

2. The method of controlling misting when coating flexible supports of claim 1, wherein the organosilicon compound N is used and selected from the group consisting of: $CH_3Si(OCH_3)_3$, $CH_3Si(OC_2H_5)_3$, $(CH_2\!\!=\!\!CH)Si(OCH_3)_3$, $Si(OC_2H_5)_4$, $Si(OC_3H_7)_4$, $(CH_2\!\!=\!\!CH)Si(OC_2H_5)_3$, and $Si(OC_2H_4OC_2H_5)_4$.

3. The method of controlling misting when coating flexible supports of claim 2, wherein the polyorganosiloxane A crosslinkable by polyaddition has units of formula (III) and optionally at least some units of formula (IV):

$$W_a Z_b SiO\frac{4-(a+b)}{2} \qquad (III)$$

$$Z_c SiO\frac{4-c}{2} \qquad (IV)$$

in which:
W is an alkenyl group,
the symbols Z, which are identical or different, represent:
a linear or branched alkyl radical which contains 1 to 20 carbon atoms and is optionally substituted by at least one halogen,
a cycloalkyl radical which contains from 5 to 8 cyclic carbon atoms and is optionally substituted,
an aryl radical which contains from 6 to 12 carbon atoms and is optionally substituted, and/or
an aralkyl moiety which has an alkyl moiety containing from 5 to 14 carbon atoms and an aryl moiety containing from 6 to 12 carbon atoms, and is optionally substituted on the aryl moiety by a halogen and/or an alkyl,
a is 1 or 2, b is 0, 1 or 2, and a +b =1, 2 or 3, and
c=0, 1, 2 or 3.

4. The method of claim 3, wherein said reacting is at a temperature from 0° C. to 200° C.

5. The method of claim 3, wherein a =1.

6. The method of controlling misting when coating flexible supports of claim 2, wherein the crosslinking organosilicon compound B is present and has units of formula (V) and optionally at least some of the other units are units of formula (VI):

$$HL_c SiO_{(3-c)/2} \qquad (V)$$

$$L_g SiO_{(4-g)/2} \qquad (VI)$$

in which:
the symbols L, which are identical or different, represent:
a linear or branched alkyl radical which contains 1 to 20 carbon atoms and is optionally substituted by at least one halogen,
a cycloalkyl radical which contains from 5 to 8 cyclic carbon atoms and is optionally substituted,
an aryl radical which contains from 6 to 12 carbon atoms and is optionally substituted, and/or
an aralkyl moiety which has an alkyl moiety containing from 5 to 14 carbon atoms and an aryl moiety containing from 6 to 12 carbon atoms, and is optionally substituted on the aryl moiety by a halogen and/or alkyl,
c=0, 1 or 2, and
g=0, 1, 2 or 3.

7. The method of claim 6, wherein said reacting is at a temperature from 0° C. to 200° C.

8. The method of claim 2, wherein said reacting is at a temperature from 0° C. to 200° C.

9. The method of controlling misting when coating flexible supports of claim 1, wherein said liquid silicone composition X comprises:
at least one polyorganosiloxane A crosslinkable by polyaddition,
at least one crosslinking organosilicon compound B,
at least one catalyst Cl of the polyaddition reaction,
optionally at least one adhesion modulator system K, and
optionally at least one crosslinking inhibitor D.

10. The method of claim 9, wherein said reacting is at a temperature from 0° C. to 200° C.

11. The method of claim 1, wherein said reacting is at a temperature from 0° C. to 200° C.

12. The method of claim 1, wherein the antimisting additive E has a viscosity of about 100,000 cP or less at 25° C.

13. The method of claim 1, wherein the organosiloxane monomer, oligomer and/or polymer G has a viscosity of about 14,000 cP at 25° C.

14. A liquid silicone composition X which is a precursor of a silicone coating and comprises:
at least one polyorganosiloxane A crosslinkable by polyaddition, by dehydrocondensation, by polycondensation, cationically or free-radically,
at least one antimisting additive E obtained 1) by reacting at least one compound selected from compounds a) to d):
   a) an organosilicon resin F (optionally diluted by a diluent J', a solvent J", or in a constituent of said liquid silicone composition X) comprising in a structure thereof, at least two different siloxy units selected from those of formula:
   $(R^1)_3SiO_{1/2}$ (M unit),
   $(R^1)_2SiO_{2/2}$ (D unit),
   $R^1SiO_{3/2}$ (T unit), and
   $SiO_{4/2}$ (Q unit),
      in which units:
      the radicals $R^1$, which are identical or different, are selected from linear or branched $C_1$ to $C_6$ alkyl radicals, $C_2$ to $C_4$ alkenyl radicals, and 3,3,3-trifluoropropyl, with the following conditions:
      that at least one of these units is a T or Q unit, and
      that said organosilicon resin F comprises groups ≡SiOH and/or ≡SiOR², the amount by weight of groups OH and/or OR² being from 0.2% to 10% by weight, with $R^2$ being a linear or branched $C_1$ to $C_6$ alkyl radical,
   b) an organosilicon compound N of formula:

$R^3_d SiX_{4-d}$ in which $R^3$ is a monovalent hydrocarbon group having 1 to 5 carbon atoms, X is a hydrolyzable group, and d has an average value ≤1;
   c) a partially hydrolyzed condensate L of said organosilicon compound N;
   d) a condensate M of said organosilicon resin F with said organosilicon compound N or said condensate L;
with:
   e) at least one organosiloxane monomer, oligomer and/or polymer G which is:

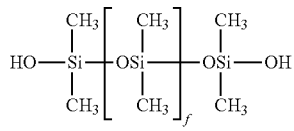

in which 1 ≤ f ≤ 1,000,
   in the presence:
      of at least one polycondensation catalyst H,
      optionally of a filler Z, and
      optionally of at least one diluent J' or solvent J",
      so as to obtain a branched polymer, and
2) by isolating the antimisting additive E, optionally after removal of the condensation catalyst H, and/or devolatilization and/or neutralization,
optionally at least one crosslinking organosilicon compound B,
optionally at least one catalyst or photoinitiator C selected according to a reaction
envisaged for said polyorganosiloxane A,
optionally at least one adhesion modulator system K, and
optionally at least one crosslinking inhibitor D.

15. The liquid silicone composition X of claim 14, wherein the antimisting additive E has a viscosity of about 100,000 cP or less at 25° C.

16. An antimisting additive E to reduce misting when coating flexible supports with a liquid silicone composition X which is a precursor of silicone coating said additive E is in a liquid form, optionally following dilution by a diluent J', a solvent J", or in a constituent of said liquid silicone composition X, and
said additive E is obtained
   1) by reacting at least one compound selected from compounds a) to d):
      a) an organosilicon resin F (optionally diluted by a diluent J', a solvent J", or in a constituent of said liquid silicone composition X) comprising in a structure thereof, at least two different siloxy units selected from those of formula:
      $(R^1)_3SiO_{1/2}$ (M unit),
      $(R^1)_2SiO_{2/2}$ (D unit),
      $R^1SiO_{3/2}$ (T unit), and
      $SiO_{4/2}$ (Q unit),
         in which units:
         the radicals $R^1$, which are identical or different, are selected from linear or branched $C_1$ to $C_6$ alkyl radicals, $C_2$ to $C_4$ alkenyl radicals, and 3,3,3-trifluoropropyl, with the following conditions:
         that at least one of these units is a T or Q unit, and
         that said organosilicon resin F comprises groups ≡SiOH and/or ≡SiOR², the amount by weight of groups OH and/or OR² being from 0.2% to 10% by weight, with $R^2$ being a linear or branched $C_1$ to $C_6$ alkyl radical,
      b) an organosilicon compound N of formula:

$R^3_d SiX_{4-d}$ in which $R^3$ is a monovalent hydrocarbon group having 1 to 5 carbon atoms, X is a hydrolyzable group, and d has an average value ≤1;
      c) a partially hydrolyzed condensate L of said organosilicon compound N;
      d) a condensate M of said organosilicon resin F with said organosilicon compound N or said condensate L;
   with:
      e) at least one organosiloxane monomer, oligomer and/or polymer G which is:

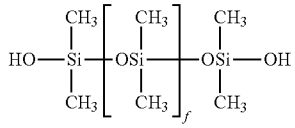

in which 1 ≤ f ≤ 1,000,
      in the presence:
         of at least one polycondensation catalyst H,
         optionally of a filler Z, and
         optionally of at least one diluent J' or solvent J",
         so as to obtain a branched polymer, and
   2) by isolating the antimisting additive E, optionally after removal of the condensation catalyst H, and/or devolatilization and/or neutralization,
      wherein the organosiloxane monomer, oligomer and/or polymer G has a viscosity of about 14,000 cP at 25° C.

* * * * *